United States Patent
Stanback et al.

(10) Patent No.: US 7,460,688 B2
(45) Date of Patent: Dec. 2, 2008

(54) SYSTEM AND METHOD FOR DETECTING AND CORRECTING DEFECTIVE PIXELS IN A DIGITAL IMAGE SENSOR

(75) Inventors: John H. Stanback, Ft Collins, CO (US); Xuemei Zhang, Mountain View, CA (US); Ramakrishna Kakarala, Santa Clara, CA (US); Bond Yu Pong Ying, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 680 days.

(21) Appl. No.: 11/007,979

(22) Filed: Dec. 9, 2004

(65) Prior Publication Data

US 2006/0126127 A1    Jun. 15, 2006

(51) Int. Cl.
   G06K 9/00    (2006.01)
(52) U.S. Cl. .................. 382/103; 382/275; 348/246; 348/247
(58) Field of Classification Search .......... 348/243, 348/272, 250, 24, 240, 246, 247; 382/162, 382/167, 250, 172
   See application file for complete search history.

(56) References Cited

U.S. PATENT DOCUMENTS

| | | | |
|---|---|---|---|
| 5,652,621 A | | 7/1997 | Adams, Jr. et al. |
| 6,296,387 B1 | | 10/2001 | Guillemaud |
| 6,377,702 B1 | * | 4/2002 | Cooper ...................... 382/167 |
| 6,603,552 B1 | * | 8/2003 | Cline et al. ................. 356/417 |
| 6,625,318 B1 | * | 9/2003 | Tan et al. ..................... 382/224 |
| 6,737,625 B2 | * | 5/2004 | Baharav et al. ........... 250/208.1 |
| 7,102,673 B2 | * | 9/2006 | Kimura ....................... 348/246 |

(Continued)

FOREIGN PATENT DOCUMENTS

EP    0341700 A2    5/1989

(Continued)

OTHER PUBLICATIONS

Xiaobing Zhou, Shusun, Sub-pixel correction in comparison between in situ and satellite derived spectral reflectance, Published data Jun. 2002, Geophys. Inst., Alaska Univ., Fair vol. 2: Geoscience and Remote Sensing Symposium, 2002. IGARSS '02. 2002 IEEE Internation.*

(Continued)

*Primary Examiner*—Brian Q Le
*Assistant Examiner*—Mekonen Bekele
(74) *Attorney, Agent, or Firm*—Ratner Prestia

(57) ABSTRACT

A digital image sensor comprising an array of pixels and a processor is provided. The array of pixels comprises a current pixel in a first color plane that is configured to produce a current sensor value, a first plurality of pixels in the first color plane that is configured to produce a first plurality of sensor values, and a second plurality of pixels in the second color plane that is configured to produce a second plurality of sensor values. The processor is configured to generate a plurality of estimate values using the first plurality of sensor values and a plurality of intensity ratios associated with the second plurality of sensor values, and the processor is configured to determine whether the current pixel is defective using the plurality of estimate values and the current sensor value.

20 Claims, 3 Drawing Sheets

U.S. PATENT DOCUMENTS

| | | | |
|---|---|---|---|
| 7,171,039 B2 * | 1/2007 | Kondo et al. | 382/149 |
| 7,209,168 B2 * | 4/2007 | Post | 348/246 |
| 7,283,164 B2 * | 10/2007 | Kakarala et al. | 348/246 |
| 2001/0052938 A1 | 12/2001 | Itoh | |

FOREIGN PATENT DOCUMENTS

| | | | |
|---|---|---|---|
| EP | 1562144 A1 | | 8/2005 |
| WO | WO/02/005233 | * | 7/2002 |
| WO | WO/02/052336 | * | 7/2002 |
| WO | WO/03/046665 | * | 6/2003 |

OTHER PUBLICATIONS

Han. T Goodenough, D.G, Detection and correction of abnormal pixels in Hyperion image, Published Data Jun. 24-28, 2002,Geoscience and Remote Sensing Symposium, 2002. IGARSS '02. 2002 IEEE International,vol. 3.*

Han. T Goodenough, D.G, Detection and correction of abnormal pixels in Hyperion image, Published Data Jun. 24-28, 2002,Geoscience and Remote Sensing Symposium, 2002. IGARSS '02. 2002 IEEE International,vol. 3.*

Nicos Herodotou and Anastasios N. Venetsanopoulos; Colour Image Interpolation for High Resolution Acquisition and Display Devices;IEEE Transactions on Consumer Electronics, vol. 41, No. 4, Nov. 1995; pp. 1118-1126.

Bo Tao, Ingeborg Tastl, Ted Cooper, Mike Blasgen and Eric Edwards; Demosaicing using Human Visual Properties and Wavelet Interpolation Filtering; Proceedings of the IS&T/SID Seventh Color Imaging Conference: Color Science, Systems, and Applications, Scottsdale, Arizona, 1999; pp. 252-256.

Guy Meynants and Bart Dierickx: A Circuit for the correction of Pixel Defects in Image Sensors, Proceedings of the 24th European Solid-State Circuits Conference, Sep. 22-24, 1998, The Hague, Netherlands; pp. 312-315.

Yap-Peng Tan and Tinku Acharyz; A Robust Sequential Approach for the Detection of Defective Pixels in an Image Sensor; Proceedings of the 1999 International Conference on Acoustic,Speech, and Signal Processing, Phoenix, Arizona, Mar. 15-19, 1999;pp. 2239-2242.

Knutsson, Hans et al., "Normalized and Differential Convolution" Computer Vision and PatternRecognition. 1993, pp. 515-523.

The GB Search Report for Application No. GB0523167.5 mailed on Feb. 15, 2006.

Knutsson, Hans et al. "Normalized and Differential Convolution" Computer Vision and Pattern Recognition, 1993, pp. 513-523 IEEE, 1063-691993.

* cited by examiner

SYSTEM AND METHOD FOR DETECTING AND CORRECTING DEFECTIVE PIXELS IN A DIGITAL IMAGE SENSOR

CROSS-REFERENCE TO RELATED APPLICATIONS

This application is related to U.S. patent application Ser. No. 10/246,124, filed on Sep. 18, 2002, entitled METHOD FOR DETECTING AND CORRECTING DEFECTIVE PIXELS IN A DIGITAL IMAGE SENSOR. The above U.S. Patent Application is assigned to the assignee of the present invention, and is hereby incorporated by reference herein.

BACKGROUND

Many electronic devices include electronic image sensors. Electronic image sensors are often one of two types—CCDs (charge coupled devices) and CMOS-APS (complimentary metal oxide semiconductor—active pixel sensors). Each type of electronic image sensor includes an array of photo-detectors (i.e., pixels) that are arranged in a pattern. Each pixel measures the intensity of light for one of a set of ranges of wavelengths of light in response to being exposed to an image. Each of the sets of ranges may be associated with a color perceived by the human visual system.

Unfortunately, electronic image sensors may include defective pixels. A defective pixel is a pixel that responds inappropriately to exposed light from an image and thereby produces an inaccurate sensor value. A defective pixel may be a stuck high pixel where a pixel has an abnormally high (e.g., full or near full scale) output, a stuck low pixel where a pixel has an abnormally low (e.g., zero or near zero scale) output, or abnormally sensitive pixel where a pixel differs significantly from neighboring pixels that are exposed to the same light conditions.

It would be desirable to be able to accurately detect and correct defective pixels from an electronic image sensor.

SUMMARY

One exemplary embodiment provides digital image sensor comprising an array of pixels and a processor. The array of pixels comprises a current pixel in a first color plane that is configured to produce a current sensor value, a first plurality of pixels in the first color plane that is configured to produce a first plurality of sensor values, and a second plurality of pixels in the second color plane that is configured to produce a second plurality of sensor values. The processor is configured to generate a plurality of estimate values using the first plurality of sensor values and a plurality of intensity ratios associated with the second plurality of sensor values, and the processor is configured to determine whether the current pixel is defective using the plurality of estimate values and the current sensor value.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
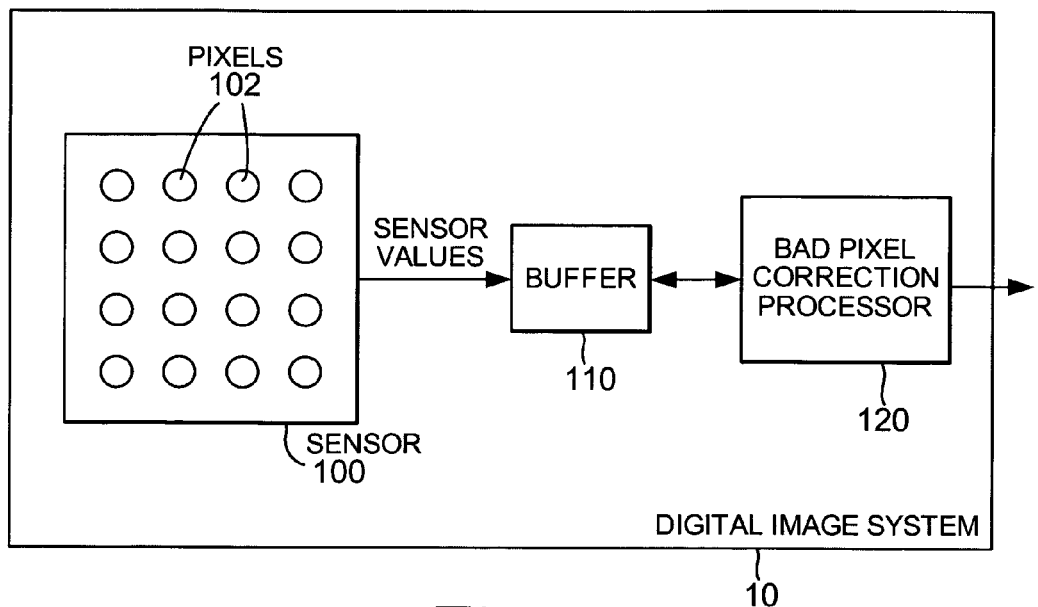
FIG. 1 is a block diagram illustrating one embodiment of a digital imaging system for detecting and correcting defective pixels.

FIG. 1 is a block diagram illustrating one embodiment of a digital imaging system 10 for detecting and correcting defective pixels. Digital imaging system 10 comprises a sensor 100 having a plurality of pixels 102, a buffer 110, and a bad pixel correction (BPC) processor 120.

Sensor 100 comprises a CCD (charge coupled device), CMOS-APS (complimentary metal oxide semiconductor—active pixel sensor), or other suitable sensor. Sensor 100 comprises a two-dimension array of pixels 102 that are arranged in rows and columns. Sensor 100 may be covered by a color filter array (CFA) such that each pixel 102 senses only one color, i.e., one range of wavelengths of light. In one embodiment, the CFA is a Bayer CFA where chrominance colors (e.g., red and blue) are interspersed among a checkerboard pattern of luminance colors (e.g., green). In other embodiments, other CFAs may be used that employ other color representations (e.g., yellow, cyan, and magenta). Sensor 100 produces sensor values associated with an image for each pixel 102 in response to being exposed to light from the image. Sensor 100 provides the sensor values to buffer 110.

Buffer 110 comprises a volatile or non-volatile storage device (e.g., RAM or flash memory) operatively coupled to sensor 100 and BPC processor 120. Buffer 110 may be integrated on a common substrate with or may be external to BPC processor 120. Buffer 110 is configured to store sensor values received from sensor 100 and provide the sensor values to BPC processor 120.

BPC processor 120 comprises any combination of hardware or software components configured to perform the functions described herein. Any software components of BPC module may be stored on a portable or non-portable medium accessible by a processing system such that the instructions of the software components may be executed by the processing system. BPC processor 120 may be integrated on a common substrate with or may be external to sensor 100. BPC processor 120 receives the sensor values from buffer 110 and detects and corrects sensor values associated with defective pixels 102.

A defective pixel is a pixel 102 that responds inappropriately to exposed light from an image and thereby produces an inaccurate sensor value. A defective pixel may be a stuck high pixel where a pixel 102 has an abnormally high (e.g., full or near full scale) output, a stuck low pixel where a pixel 102 has an abnormally low (e.g., zero or near zero scale) output, or abnormally sensitive pixel where a pixel 102 differs significantly from neighboring pixels 102 that are exposed to the same light conditions.

In operation, sensor 100 provides blocks of sensor values associated with an image to buffer 110 in response to being exposed to light from the image. BPC processor 120 accesses the sensor values from buffer 110 and detects and corrects sensor values associated with defective pixels 102 of sensor 100 as will now be described in additional detail.

Figure 2:
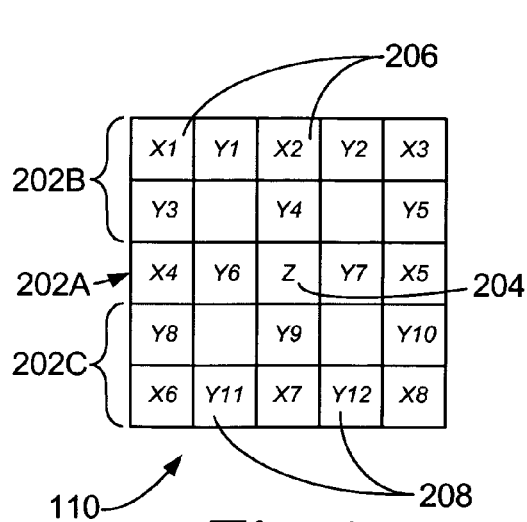
FIG. 2 is a diagram illustrating an example of sensor values in a buffer.

FIG. 2 is a diagram illustrating an example of sensor values in buffer 110. In FIG. 2, buffer 110 includes a current row 202A of sensor values, two neighboring rows 202B of sensor values that are previous to the current row 202A, and two neighboring rows 202C of sensor values that are subsequent to the current row 202A. A sensor value 204 of the current pixel under review by BPC processor 120 is labeled "Z". Sensor values 206 obtained from pixels 102 that are in the same color plane as the current pixel are labeled "Xn", and sensor values 208 obtained from pixels 102 that are in a different color plane from the current pixel are labeled "Yn". The pixels associated with sensor values 206 and 208 are collectively referred to as the neighboring pixels of the current pixel. Sensor values not used in determining whether the current pixel is defective are not shown.

Figure 3:
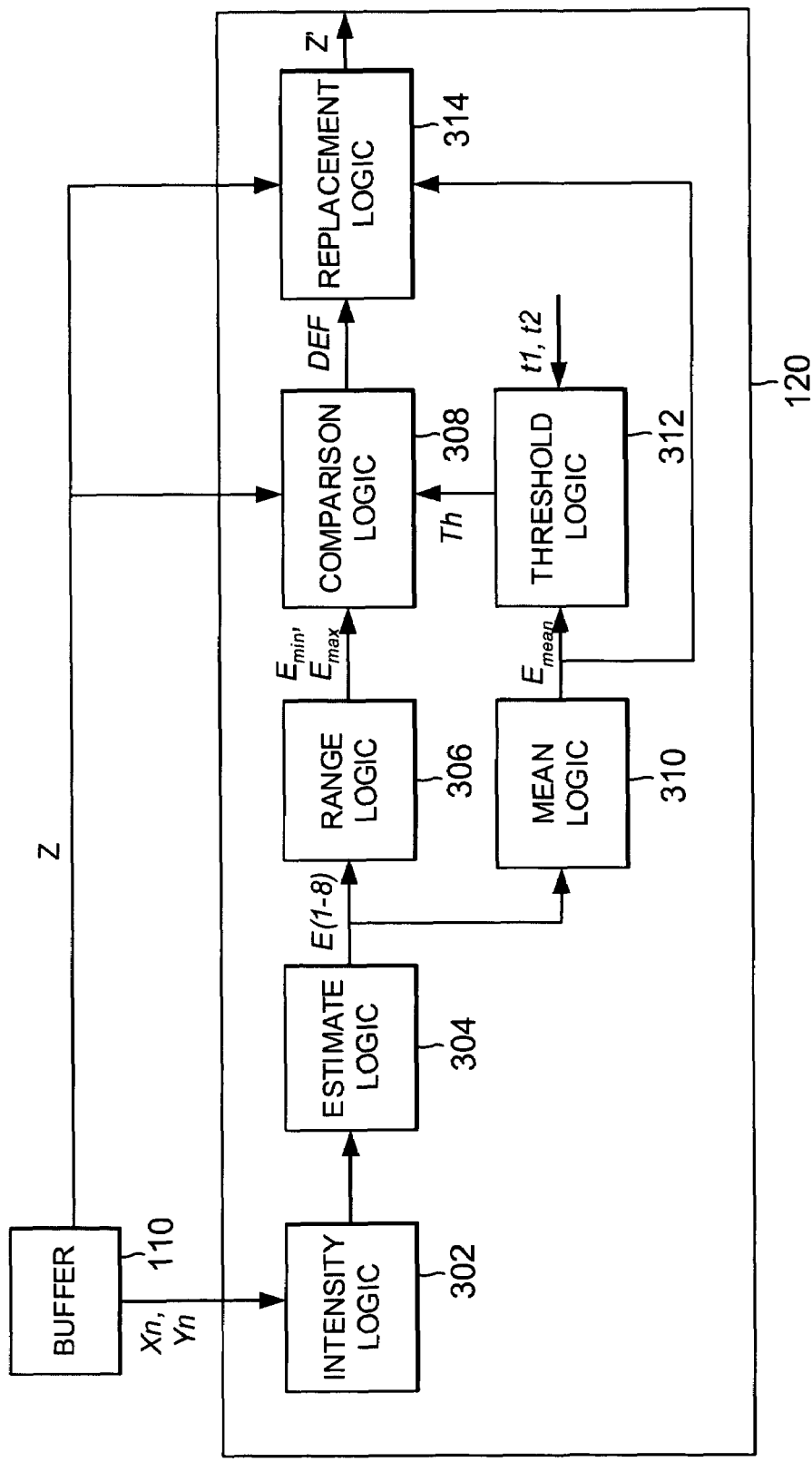
FIG. 3 is a block diagram illustrating one embodiment of a bad pixel correction module.

The 5×5 block of sensor values shown in FIG. 2 are used to illustrate an embodiment of BPC processor 120 as shown in FIG. 3. In FIG. 3, BPC processor 120 comprises intensity logic 302, estimate logic 304, range logic 306, comparison logic 308, mean logic 310, threshold logic 312, and replacement logic 314. The functions of each logic block of BPC processor 120 will be described with reference to FIG. 4.

Figure 4:
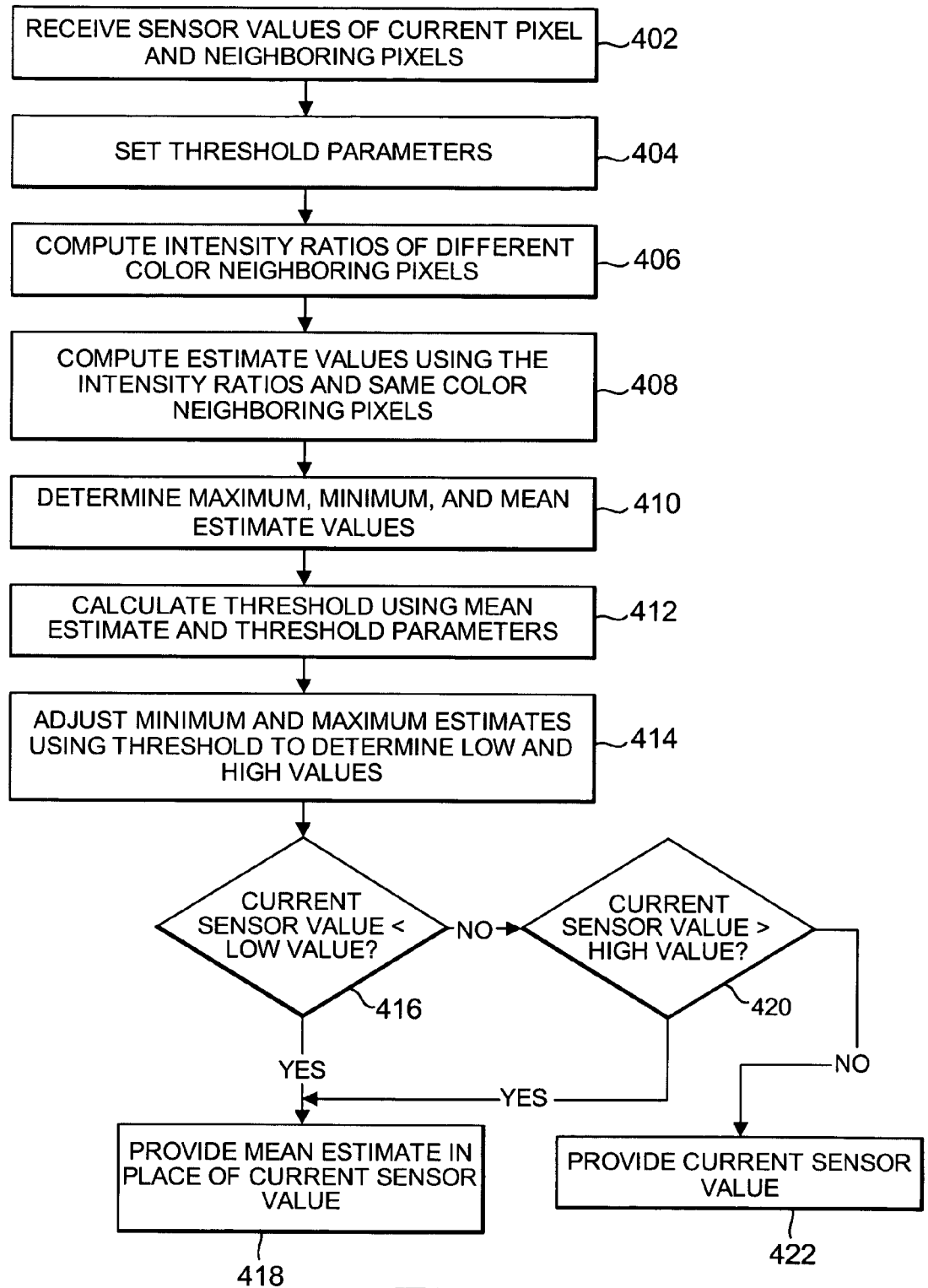
FIG. 4 is a flow chart illustrating one embodiment of a method for detecting and correcting defective pixels.

Referring simultaneously to FIGS. 2, 3, and 4, sensor values of a current pixel and neighboring pixels are received from buffer 110 by BPC processor 120 as indicated in a block 402. More particularly, the sensor values of the neighboring pixels are received from buffer 110 by intensity logic 302, and the sensor value of the current pixel is received from buffer 110 by comparison logic 308 and replacement logic 314.

Threshold parameters are set by BPC processor 120 as indicated in a block 404. The threshold parameters, t1 and t2, are accessed either within BPC processor 120 or externally from BPC processor 120 and provided to threshold logic 312.

BPC processor 120 computes intensity ratios of different color neighboring pixels as indicated in a block 406. More particularly, intensity logic 302 computes horizontal, vertical, and diagonal intensity averages of neighboring pixels that are in a different color plane from the current sensor value and generates intensity ratios using the intensity averages. Intensity logic 302 calculates horizontal intensity averages using sensor values from the same row and different columns, intensity logic 302 calculates vertical intensity averages using sensor values from different rows and the same column, and intensity logic 302 calculates diagonal intensity averages using sensor values from different rows and different columns. Examples of intensity averages and intensity ratios calculated by intensity logic 302 may be seen in Equations I through VIII below. Intensity logic 302 provides the intensity ratios to estimate logic 304.

BPC processor 120 computes estimate values using the different color intensity ratios and same color neighboring pixels as indicated in a block 408. More particularly, estimate logic 304 receives the intensity ratios from intensity logic 302 and calculates eight estimate values, E1 to E8, using Equations I through VIII as follows.

$$E1 = \frac{X2 \times \left(\frac{Y6+Y7}{2}\right)}{\left(\frac{Y1+Y2}{2}\right)} = X2 \times \left(\frac{Y6+Y7}{Y1+Y2}\right) \quad \text{EQUATION I}$$

$$E2 = \frac{X7 \times \left(\frac{Y6+Y7}{2}\right)}{\left(\frac{Y11+Y12}{2}\right)} = X7 \times \left(\frac{Y6+Y7}{Y11+Y12}\right) \quad \text{EQUATION II}$$

$$E3 = \frac{X4 \times \left(\frac{Y4+Y9}{2}\right)}{\left(\frac{Y3+Y8}{2}\right)} = X4 \times \left(\frac{Y4+Y9}{Y3+Y8}\right) \quad \text{EQUATION III}$$

$$E4 = \frac{X5 \times \left(\frac{Y4+Y9}{2}\right)}{\left(\frac{Y5+Y10}{2}\right)} = X5 \times \left(\frac{Y4+Y9}{Y5+Y10}\right) \quad \text{EQUATION IV}$$

$$E5 = \frac{X1 \times \left(\frac{Y7+Y9}{2}\right)}{\left(\frac{Y1+Y3}{2}\right)} = X1 \times \left(\frac{Y7+Y9}{Y1+Y3}\right) \quad \text{EQUATION V}$$

$$E6 = \frac{X3 \times \left(\frac{Y6+Y9}{2}\right)}{\left(\frac{Y2+Y5}{2}\right)} = X3 \times \left(\frac{Y6+Y9}{Y2+Y5}\right) \quad \text{EQUATION VI}$$

$$E7 = \frac{X6 \times \left(\frac{Y4+Y7}{2}\right)}{\left(\frac{Y8+Y11}{2}\right)} = X6 \times \left(\frac{Y4+Y7}{Y8+Y11}\right) \quad \text{EQUATION VII}$$

$$E8 = \frac{X8 \times \left(\frac{Y4+Y6}{2}\right)}{\left(\frac{Y10+Y12}{2}\right)} = X8 \times \left(\frac{Y4+Y6}{Y10+Y12}\right) \quad \text{EQUATION VIII}$$

As shown in Equations I through VIII, estimate logic 304 calculates the eight estimate values, E1 to E8, by multiplying a sensor value from the same color plane as the current sensor value by an intensity ratio of two intensity averages of sensor values from a different color plane than the current sensor value. In other embodiments, the intensity ratios may be calculated using intensity means, medians, or means where extreme values are excluded. For each of the eight estimate values, E1 to E8, calculated using Equations I through VIII, estimate logic 304 sets the estimate value equal to a maximum value if the estimate value calculated using Equations I through VIII exceeds the maximum value. Estimate logic 304 provides the eight estimate values, E1 to E8, to range logic 306 and mean logic 310. If a denominator value in the intensity ratio is zero, then an alternate value may be substituted for the zero to ensure that an undefined value is not generated.

Any alternate value may be substituted for the zero in the denominator. For example, if a value close to zero is selected in the equation, then the resulting estimate of the equation (E1 to E8) will likely exceed the full scale pixel output value (defined as abnormally high). The range logic 306 may then ignore the resulting estimate.

In the above example, the resulting estimate may be considered an extreme value. It will be appreciated, however, that range logic 306 may define an extreme value to have a value greater than a full scale output or smaller than a near zero scale output.

BPC processor 120 determines maximum, minimum, and mean estimate values as indicated in a block 410. More particularly, range logic 306 receives the eight estimate values, E1 to E8, from estimate logic 304 and determines a minimum estimate value, $E_{min}$, and a maximum estimate value, $E_{max}$, of the values E1 to E8. Range logic 306 provides the minimum and maximum estimate values, $E_{min}$ and $E_{max}$, to comparison logic 308. Mean logic 310 receives the eight estimate values, E1 to E8, from estimate logic 304 and determines a mean estimate value, $E_{mean}$, of the values E1 to E8. The mean estimate value, $E_{mean}$, may comprise a mean, a median, or a mean where extreme values are excluded. Mean logic 310 provides the mean estimate value, $E_{mean}$, to threshold logic 312 and replacement logic 314.

BPC processor 120 calculates a threshold value using the mean estimate and threshold parameters as indicated in a block 412. More particularly, threshold logic 312 receives the mean estimate value, $E_{mean}$, from mean logic 310 and, using the threshold parameters t1 and t2, calculates a threshold value, Th, using Equation IX.

$$Th = t1 + (t2 \times E_{mean}) \quad \text{EQUATION IX}$$

Threshold logic 312 provides the threshold value, Th, to comparison logic 308.

BPC processor 120 adjusts the minimum and maximum estimates using the threshold value to determine low and high values, respectively, as indicated in a block 414. More particularly, comparison logic 308 generates the low value by subtracting the threshold value, Th, received from threshold logic 312 from the minimum estimate value, $E_{min}$, received from range logic 306 as shown in Equation X.

$$\text{Low Value} = E_{min} - Th \quad \text{EQUATION X}$$

In addition, comparison logic 308 generates the high value by adding the threshold value, Th, received from threshold logic 312 to the maximum estimate value, $E_{max}$, received from range logic 306 as shown in Equation XI.

$$\text{High Value} = E_{max} + Th \quad \text{EQUATION XI}$$

A determination is made by BPC processor 120 as to whether the current sensor value is less than the low value as indicated in a block 416. More particularly, comparison logic 308 compares the current sensor value to the low value generated using Equation X to determine if the current sensor value is less than the low value. If the current sensor value is less than the low value, then the pixel 102 associated with the current sensor value is determined to be defective and BPC processor 120 provides the mean estimate value in place of the current sensor value as indicated in a block 418. In response to comparison logic 308 determining that the current sensor value is less than the low value, comparison logic 308 generates a defective signal, DEF, and provides the defective signal, DEF, to replacement logic 314. In response to receiving the defective signal, DEF, replacement logic 314 provides the mean estimate value, $E_{mean}$, received from mean logic 314 as the current sensor value Z' instead of the current sensor value Z provided from buffer 110.

If the current sensor value is not less than the low value, then a determination is made by BPC processor 120 as to whether the current sensor value is greater than the high value as indicated in a block 420. More particularly, comparison logic 308 compares the current sensor value to the high value generated using Equation XI to determine if the current sensor value is greater than the high value. If the current sensor value is greater than the high value, then the pixel 102 associated with the current sensor value is determined to be defective and BPC processor 120 provides the mean estimate value in place of the current sensor value as indicated in block 418. In response to comparison logic 308 determining that the current sensor value is greater than the high value, comparison logic 308 generates the defective signal, DEF, and provides the defective signal, DEF, to replacement logic 314. In response to receiving the defective signal, DEF, replacement logic 314 provides the mean estimate value, $E_{mean}$, received from mean logic 314 as the current sensor value Z' instead of the current sensor value Z provided from buffer 110.

If the current sensor value is not greater than the high value, then the pixel 102 associated with the current sensor value is determined not to be defective and BPC processor 120 provides the current sensor value as indicated in a block 422. In response to comparison logic 308 determining that the current sensor value is not greater than the high value, comparison logic 308 does not provide the defective signal, DEF, to replacement logic 314. Accordingly, replacement logic 314 provides the current sensor value Z provided from buffer 110 as the current sensor value Z'.

Figure 5:
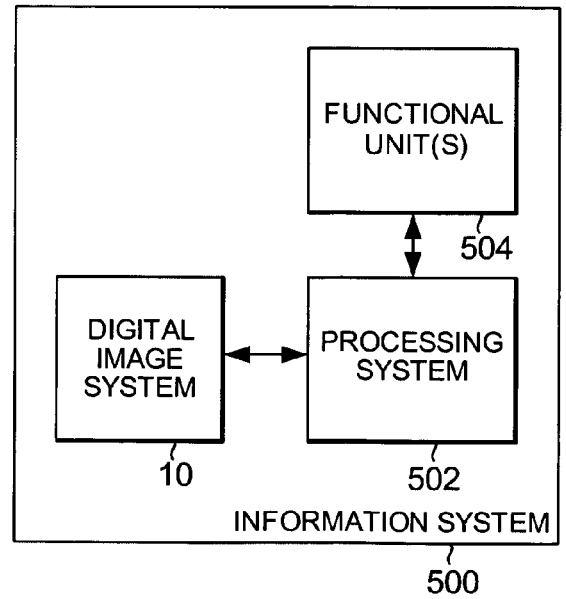
FIG. 5 is block diagram illustrating one embodiment of an information system.

FIG. 5 is block diagram illustrating one embodiment of an information system 500. Information system 500 comprises digital imaging system 10, a processing system 502, and one or more optional functional units 504.

Information system 500 may be any system that incorporates digital imaging system 10, either internally or externally, as a primary or auxiliary system. For example, information system 500 may be a digital still or video camera, a cellular telephone, a personal digital assistant (PDA), a portable (e.g., a laptop) or non-portable (e.g., a desktop or server) computer system, or a medical imaging device.

Processing system 502 controls or manages the operation of digital imaging system 10 and any functional units 504. Processing system 502 may provide information from digital imaging system 10 to functional units 504 and may provide information from functional units 504 to digital imaging system 10. Processing system 502 may include any combination of hardware and software components such as one or more processors or controllers and one or more storage devices for storing software executable by the processors or controllers.

Functional units 504 may include any combination of hardware and software components that are internal or external to information system 500. Examples of functional units 504 include networking or communication devices (e.g., modems or cellular telephone transceivers) configured to communicate with other information systems and display devices configured to display images from digital imaging system 10.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A digital image sensor comprising:
an array of pixels comprising a current pixel in a first color plane that is configured to produce a current sensor value, a first plurality of pixels in the first color plane that is configured to produce a first plurality of sensor values, and a second plurality of pixels in the second color plane that is configured to produce a second plurality of sensor values; and
a processor configured to generate a plurality of estimate values using the first plurality of sensor values and a plurality of intensity ratios associated with the second plurality of sensor values, and the processor configured to determine whether the current pixel is defective using the plurality of estimate values and the current sensor value;

wherein the first plurality of pixels in the first color plane are disposed at locations of the array that are different from pixel locations of the second color plane.

2. The digital image sensor of claim 1, wherein the processor is configured to generate each of the plurality of estimate values by multiplying one of the first plurality of sensor values by one of the plurality of intensity ratios.

3. The digital image sensor of claim 1 wherein the processor is configured to generate each of the plurality of intensity ratios by dividing a first value generated from a first set of the second plurality of sensor values by a second value generated from a second set of the second plurality of sensor values.

4. The digital image sensor of claim 3 wherein the first value is selected from a first group including a mean, and a median generated from the first set of the second plurality of sensor values, and wherein the second value is selected from a second group consisting of a mean, a and a median generated from the second set of the second plurality of sensor values.

5. The digital image sensor of claim 1 wherein the processor is configured to replace the current sensor value with one of the plurality of estimate values in response to determining that the current pixel is defective.

6. The digital image sensor of claim 5 wherein the one of the plurality of estimate values is selected from a group including a mean value, a and a median value of the plurality of estimate values.

7. The digital image sensor of claim 1 wherein the processor is configured to compute a threshold value from the plurality of estimate values, and wherein the processor is configured to determine whether the current pixel is defective using the threshold value.

8. The digital image sensor of claim 1 wherein the processor is configured to compute a minimum value of the plurality of estimate values and a maximum value of the a plurality of estimate values, and wherein the processor is configured to determine whether the current pixel is defective using the minimum value and the maximum value.

9. The digital image sensor of claim 1 further comprising: a buffer configured to receive the current sensor value, the first plurality of sensor values, and the second plurality of sensor values from the array, the buffer configured to provide the current sensor value, the first plurality of sensor values to the processor, and the second plurality of sensor values to the processor.

10. A method for detecting a defective pixel in an array of pixels comprising a current pixel in a first color plane that is configured to produce a current sensor value, a first plurality of pixels in a second color plane that is configured to produce a first plurality of sensor values, and a second plurality of pixels in the first color plane that is configured to produce a second plurality of sensor values, the method comprising:
generating a plurality of estimate values using the first plurality of sensor values and a plurality of intensity ratios associated with the second plurality of sensor values; and
determining whether the current pixel is defective using the plurality of estimate values and the current sensor value;
wherein the first plurality of pixels in the first color plane are disposed at locations of the array that are different from pixel locations of the second color plane.

11. The method of claim 10 further comprising:
generating each of the plurality of estimate values by multiplying one of the first plurality of sensor values by one of the plurality of intensity ratios.

12. The method of claim 10 further comprising:
computing the plurality of intensity ratios by dividing a first value generated from a first set of the second plurality of sensor values by a second value generated from a second set of the second plurality of sensor values.

13. The method of claim 12 wherein the first value is selected from a first group including a mean, and a median generated from the first set of the second plurality of sensor values, and wherein the second value is selected from a second group including a mean, and a median generated from the second set of the second plurality of sensor values.

14. The method of claim 10 further comprising:
replacing the current sensor value with one of the plurality of estimate values in response to determining that the current pixel is defective.

15. The method of claim 14 wherein the one of the plurality of estimate value is selected from a group including a mean value, and a median value of the plurality of estimate values.

16. The method of claim 10 further comprising:
computing a minimum value of the plurality of estimate values and a maximum value of the a plurality of estimate values; and
determining whether the current pixel is defective using the minimum value and the maximum value.

17. A system comprising:
a digital image system having an array of pixels arranged in rows and columns, the array of pixels comprising a current pixel in a first color plane that is configured to produce a current sensor value associated with an image, a first plurality of pixels in the first color plane that is configured to produce a first plurality of sensor values associated with the image, and a second plurality of pixels in a second color plane that is configured to produce a second plurality of sensor values associated with the image, the digital image system configured to compute a plurality of estimate values using the first plurality of sensor values and a plurality of intensity ratios associated with the second color plane, and the digital image system configured to determine whether the current pixel is defective using the plurality of estimate values and the current sensor value; and
a processing system configured to receive the image from the digital image system;
wherein the first plurality of pixels in the first color plane are disposed at locations of the array that are different from pixel locations of the second color plane.

18. The system of claim 17 wherein the digital image system is configured to generate each of the plurality of intensity ratios by dividing a first value generated from a first set of the second plurality of sensor values by a second value generated from a second set of the second plurality of sensor values.

19. The system of claim 3 wherein the first value is selected from a first group including mean, and a median generated from the first set of the second plurality of sensor values, and wherein the second value is selected from a second group including a mean, a and a median generated from the second set of the second plurality of sensor values.

20. The system of claim 1 wherein the digital image system is configured to replace the current sensor value with one of the plurality of estimate values in response to determining that the current pixel is defective.

* * * * *